US009423929B2

(12) United States Patent
Mattos et al.

(10) Patent No.: US 9,423,929 B2
(45) Date of Patent: *Aug. 23, 2016

(54) PREDICTIVE SCROLLING

(71) Applicant: SAP SE, Walldorf (DE)

(72) Inventors: Camilo Mattos, Los Angeles, CA (US); Joel Kraut, San Francisco, CA (US); Alex C. Schaefer, Solana Beach, CA (US); Santiago Becerra, Del Mar, CA (US); Patrick Cheng, San Diego, CA (US); Jaime Zuluaga, Encinitas, CA (US)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/637,213

(22) Filed: Mar. 3, 2015

(65) Prior Publication Data

US 2015/0242069 A1    Aug. 27, 2015

Related U.S. Application Data

(63) Continuation of application No. 13/912,020, filed on Jun. 6, 2013, now Pat. No. 9,003,332, which is a continuation of application No. 13/588,041, filed on Aug. 17, 2012, now Pat. No. 8,479,115, which is a continuation of application No. 12/478,749, filed on Jun. 4, 2009, now Pat. No. 8,271,898.

(51) Int. Cl.
*G06F 3/0485* (2013.01)
*G06F 3/0482* (2013.01)
(Continued)

(52) U.S. Cl.
CPC ............ *G06F 3/0482* (2013.01); *G06F 3/0485* (2013.01); *G06F 3/04855* (2013.01);
(Continued)

(58) Field of Classification Search
CPC ........... G06F 3/00; G06F 3/048; G06F 3/041; G06F 3/01; G06F 3/017; G06F 3/0488; G06F 3/0481; G06F 3/0482; G06F 9/44543; G06F 3/0485; G06F 3/04855; G06F 3/04847; G06F 3/04817; G06F 9/4443; G06F 17/30; G06F 17/30286; G06F 17/30864; G09G 5/14; G09G 2340/0492; G11B 27/034; G06T 19/00; G06T 13/40; G06T 13/00; G06T 15/00
See application file for complete search history.

(56) References Cited

U.S. PATENT DOCUMENTS 5,452,414 A * 9/1995 Rosendahl .......... G06F 3/04815
358/1.18
5,515,486 A    5/1996 Amro et al.
(Continued)

FOREIGN PATENT DOCUMENTS

EP    1 226 487 A2    7/2002
EP    1 780 632 A2    5/2007
(Continued)

OTHER PUBLICATIONS

European Patent Office, Supplementary European Search Report and Opinion, European Patent Application No. 10783780.9, Aug. 29, 2013, thirteen pages.
(Continued)

*Primary Examiner* — Xiomar L Bautista

(57) ABSTRACT

A system and a method are disclosed for effectively displaying database records on a device having a display area that is small compared to the underlying data being represented. A simulated catalogue is displayed with cards associated with database records. Detailed information is presented for a record on a card obscuring information related to other records. A user is allowed to swipe on the catalogue causing simulated movement of the cards thereby displaying information associated with a database record previously obscured. The catalogue is moved with an initial velocity determined by the speed of swiping and decelerated based on a drag factor until it comes to a stop and displays information for the record reached. The ability to determine the final record displayed when the catalogue stops allows pre-fetching of the data associated with the record.

19 Claims, 11 Drawing Sheets

(51) Int. Cl.
*G06F 17/30* (2006.01)
*G06F 3/0488* (2013.01)

(52) U.S. Cl.
CPC ...... *G06F3/04883* (2013.01); *G06F 17/30994* (2013.01); *G06F 2203/04802* (2013.01); *Y10S 715/977* (2013.01)

(56) References Cited

U.S. PATENT DOCUMENTS

| | | | |
|---|---|---|---|
| 5,678,015 | A | 10/1997 | Goh |
| 6,043,818 | A * | 3/2000 | Nakano et al. ............... 715/851 |
| 6,119,186 | A * | 9/2000 | Watts ................ G06F 9/44505 710/104 |
| 6,188,405 | B1 * | 2/2001 | Czerwinski et al. ........... 715/764 |
| 6,466,237 | B1 * | 10/2002 | Miyao et al. .......... 715/838 |
| 7,007,242 | B2 | 2/2006 | Suomela et al. |
| 7,134,095 | B1 | 11/2006 | Smith et al. |
| 7,216,305 | B1 * | 5/2007 | Jaeger ................ G06F 3/0481 345/419 |
| 7,487,467 | B1 | 2/2009 | Kawahara et al. |
| 7,581,186 | B2 * | 8/2009 | Dowdy et al. ................. 715/727 |
| 7,694,233 | B1 * | 4/2010 | Ording ........................... 715/790 |
| 7,774,695 | B2 | 8/2010 | Kobylinski |
| 8,111,255 | B2 | 2/2012 | Park |
| 2003/0112279 | A1 | 6/2003 | Irimajiri |
| 2003/0142136 | A1 * | 7/2003 | Carter ................ G06F 3/04815 715/782 |
| 2004/0164956 | A1 * | 8/2004 | Yamaguchi ......... G06F 3/04845 345/156 |
| 2004/0164957 | A1 | 8/2004 | Yamaguchi et al. |
| 2004/0201595 | A1 | 10/2004 | Manchester |
| 2004/0205091 | A1 * | 10/2004 | Mulcahy et al. ............. 707/204 |
| 2005/0034084 | A1 | 2/2005 | Ohtsuki et al. |
| 2006/0161867 | A1 * | 7/2006 | Drucker et al. ............... 715/810 |
| 2006/0268100 | A1 * | 11/2006 | Karukka et al. ........... 348/14.01 |
| 2006/0274060 | A1 | 12/2006 | Ni et al. |
| 2007/0028187 | A1 * | 2/2007 | Katsuyama ......... G06F 3/04886 715/810 |
| 2007/0046630 | A1 | 3/2007 | Hong et al. |
| 2007/0266308 | A1 * | 11/2007 | Kobylinski ............. G06Q 10/00 715/214 |
| 2008/0266289 | A1 * | 10/2008 | Park ....................... G06F 3/0482 345/419 |
| 2009/0002335 | A1 * | 1/2009 | Chaudhri ............ G06F 3/04815 345/173 |
| 2009/0237411 | A1 * | 9/2009 | Gossweiler et al. .......... 345/473 |
| 2009/0256780 | A1 * | 10/2009 | Small ................. H04N 1/00127 345/55 |

FOREIGN PATENT DOCUMENTS

| | | |
|---|---|---|
| EP | 1 821 529 A2 | 8/2007 |
| EP | 1 986 089 A2 | 10/2008 |
| WO | WO 03/010653 A1 | 2/2003 |
| WO | WO 2006/036069 A1 | 4/2006 |

OTHER PUBLICATIONS

PCT International Search Report and Written Opinion, PCT Application No. PCT/US2010/035262, Jul. 29, 2010, seven pages.
United States Office Action, U.S. Appl. No. 13/912,020, Aug. 14, 2014, four pages.
United States Office Action, U.S. Appl. No. 13/588,041, Oct. 23, 2012, seven pages.
United States Office Action, U.S. Appl. No. 12/478,752, Jun. 2, 2014, 24 pages.
United States Office Action, U.S. Appl. No. 12/478,752, Oct. 11, 2013, 22 pages.
United States Office Action, U.S. Appl. No. 12/478,752, Nov. 30, 2012, 22 pages.
United States Office Action, U.S. Appl. No. 12/478,752, Mar. 15, 2012, 17 pages.
United States Office Action, U.S. Appl. No. 12/478,749, Sep. 29, 2011, ten pages.

* cited by examiner

PREDICTIVE SCROLLING

CROSS-REFERENCE TO RELATED APPLICATIONS

This application is a continuation of U.S. patent application Ser. No. 13/912,020, filed on Jun. 6, 2013, which is a continuation of U.S. patent application Ser. No. 13/588,041, filed on Aug. 17, 2012, now U.S. Pat. No. 8,479,115, which is a continuation of U.S. patent application Ser. No. 12/478,749, filed on Jun. 4, 2009, now U.S. Pat. No. 8,271,898, which are incorporated by reference herein in their entirety.

BACKGROUND

1. Field of Art

The disclosure relates to fetching and displaying data records on a device having a display area that is small relative to the amount of data that is being displayed.

2. Description of the Related Art

On a mobile device such as a handheld device, handheld computer, cell phone, tablet computer, or personal digital assistant (PDA), data records including those with graphs and charts have to be displayed on small display screens. Due to the limited display area, it is difficult to view more than a single complete data record at once, necessitating frequent input manipulations to load and view different records. A large amount of data that the user is not interested in may be fetched and displayed while the user scrolls through the data set looking for a data record of interest.

SUMMARY

The present invention enables effective display and navigation of database records on a mobile device. In some embodiments, the database records may represent report data and may comprise a variety of data including information in textual form, images, numerical data and the like. Examples of suitable devices include tablet computers, smart phone devices, and mobile phones. A simulated card catalogue is used to represent multiple database records such that individual cards of the catalogue are associated with individual records. A card in the front (also referred to as the front card) displays detailed information related to a database record while other cards are displayed behind the front card, and each may be wholly or partially obscured by cards closer to the front. A user provides input by swiping a finger or other input device across the display screen. The swiping input causes the cards of the catalogue to move, thereby displaying a different card in the front associated with a different database record. The ability to change the card displaying detailed information for a database record allows the user to inspect different records of the database. The direction in which the cards are moved is determined by the direction of swiping. The number of cards by which the display is advanced is determined by the speed with which the user swipes—for example, faster swiping results in more cards being moved.

The velocity of an object is determined by the speed and the direction in which the object is moving. The initial velocity with which the cards or the catalogue move is determined by the speed and direction of swiping. Subsequently, the velocity is reduced based on a deceleration factor. The reduction of the velocity causes the catalogue to stop moving after moving a number of cards. The number of cards moved for a given speed of swiping is computed to determine the final card that is displayed in the front. Each time the cards are moved, the front card is changed. When the catalogue is moving, the front card is displayed for a very short time interval and does not have to display detailed information related to the database record corresponding to the front card. Detailed information is displayed on the front card corresponding to associated database record when the catalogue stops moving. The data corresponding to the final card displayed is pre-fetched while the catalogue is moving, thereby avoiding any inefficiency associated with fetching the data. Since the record that will be displayed can be determined based on the speed of swiping, fetching of intermediate records between the initial record and the final record can be avoided. Information identifying individual database records may be displayed on cards obscured by the front card, thereby allowing the user to estimate the speed of swiping necessary to reach a particular card. The simulated object used for displaying database records is not restricted to a catalogue and can be another object such as a rolodex or a cube.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

The Figures and the following description relate to various embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Figure 1:
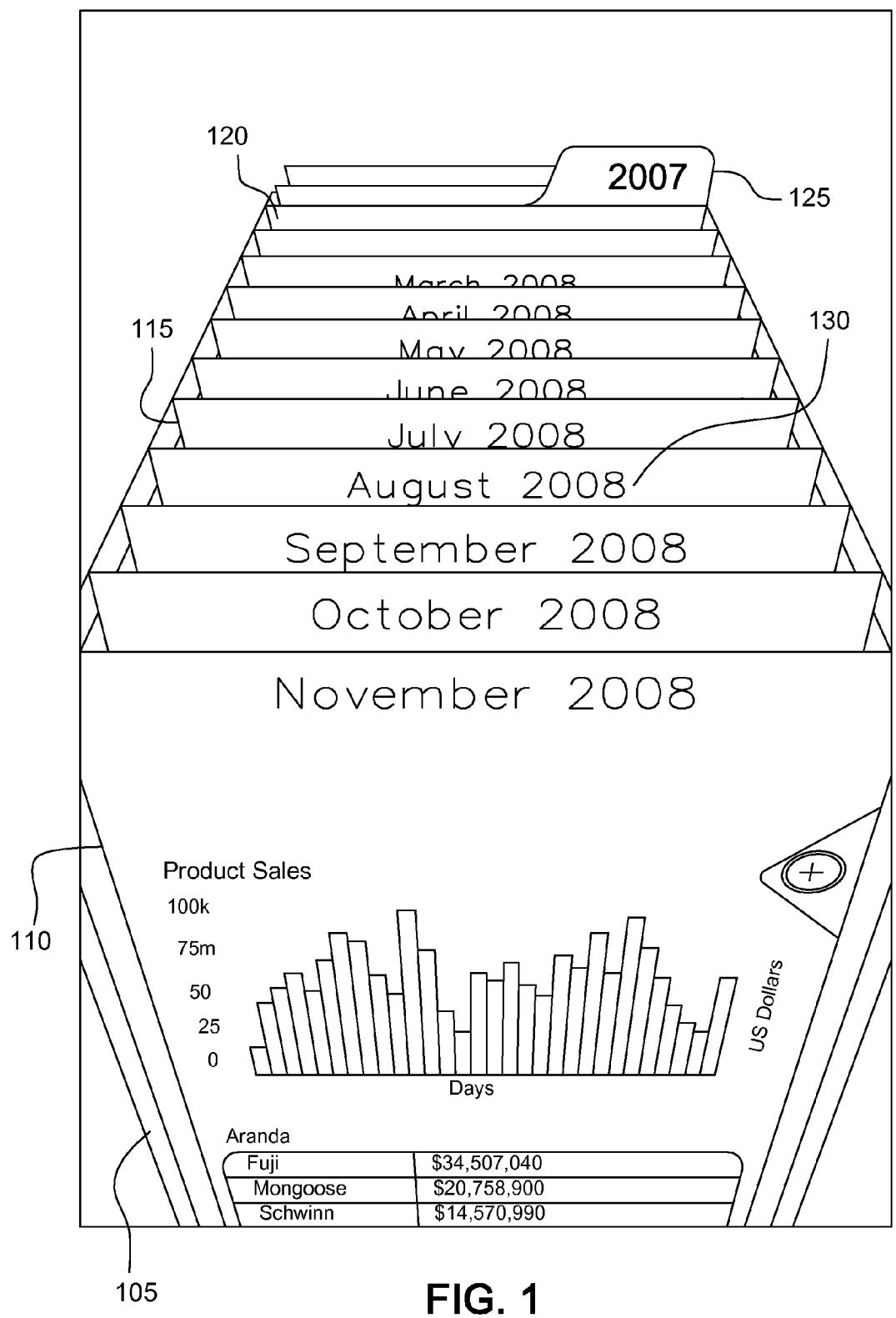
FIG. 1 illustrates a catalogue displayed on a display screen of a device presenting database records in accordance with an embodiment of the present invention.

FIG. 1 shows a graphical user interface displaying a simulated catalogue used for displaying database records. For example, the database records may represent pages of data from a report stored in the database. A user performs a swiping motion that causes the cards of the catalogue to move in the direction of the swipe, such that they appear to either move backwards from the viewer or forward towards the viewer. In one embodiment, the display of records is cyclical—that is, for n cards, the $n+1^{th}$ card displayed in forward rotation is the first record. The initial velocity with which the database records scroll is determined by the velocity of the swiping motion. The velocity with which the database records scroll is reduced until it comes to a stop, similar to an object moving with an initial velocity being decelerated until it stops. Detailed information associated with the record in the front when the scrolling stops, is then visible. The information displayed can be images or alphanumeric data stored as the record data.

Figure 2:
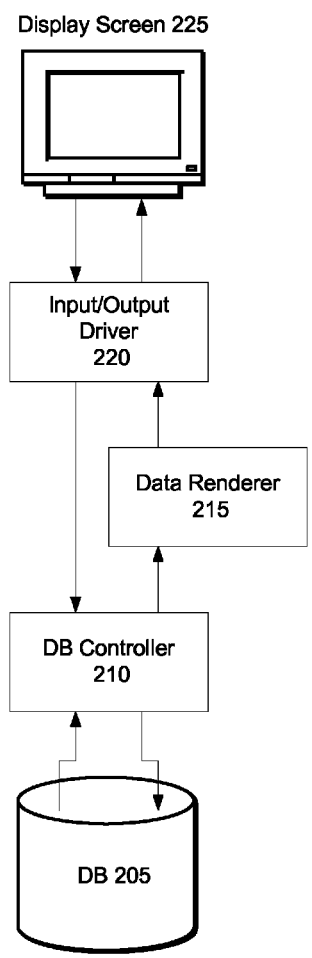
FIG. 2 illustrates one embodiment of the architecture of a system for displaying database records.

FIG. 2 is a block diagram of a system architecture in accordance with one embodiment. The components shown in FIG. 2 include a database (DB) 205, a DB controller module 210, a data renderer module 215, an input/output driver module 220 (also referred to as an IO driver module), and a display screen 225. Components such as the display screen 225 are hardware components whereas the DB controller 210 and the chart renderer 215 are software modules. As used herein, the term "module" refers to a computer program logic and/or data for providing the specified functionality. A module can be implemented in hardware, firmware, and/or software. A module can be stored in a computer program product having a computer-readable storage medium, for example, a compact disc (CD) or a DVD, or a solid state memory device, for example a flash memory. Examples of types of computers that implement the system shown in FIG. 2 include tablet computers, smart phone devices, and mobile phones as well as devices with larger screens including desktop computers.

In one embodiment, the DB 205 stores data and metadata associated with reports. The DB 205 in one embodiment is implemented using a hard disk drive but can also be implemented using any other device capable of storing data, such as a writeable compact disc (CD) or DVD, or a solid state memory device, for example a flash memory. The DB controller module 210 implements the logic to interface with the DB 205 so as to read data from the DB 205 or write data to the DB 205. The DB controller 210 provides data to the data renderer module 215 that computes information required for rendering the data. For example, the data renderer can determine the dimensions of a pie chart if the data needs to be displayed as a pie chart. The data and the information necessary for rendering the data are provided by the data renderer 215 to the input/output driver 220. The input/output driver 220 provides the display screen 225 with instructions and data necessary for displaying data and/or images. In various embodiments, the display screen 225 is used to input data and/or commands. For example, a touch sensitive screen can sense the coordinates of the portion of the screen touched by a user. The user may touch the display screen 225, for example, to select a command from a list of commands or to select a data element from a list of data elements displayed on the screen. In some embodiments, a pointing device, such as a thumbwheel, mouse, track ball, or other type of pointing device is used to input data or commands into the system. The input/output driver 220 sends the data or instructions provided by the display screen 225 to the DB controller 210. The DB controller 210 in response to data or instructions received from the input/output driver 220 reads data from DB 205 and writes data to DB 205.

A mobile device may be used to view database records. The user may be presented with a list of sets of data that can be reviewed. The user selects a particular set of data and the data renderer 215 computes information to render the set of data which is then displayed on display screen 225 in a particular format. Various other scenarios of interactions between the user and the various components and modules displayed in FIG. 2 are possible.

FIG. 1 shows a user interface displaying a catalogue 105 similar to a card catalogue used for indexing books or periodicals in a library. The cards of the catalogue 105 represent database records that may represent data associated with a report. Each card 115 of the catalogue 105 may be associated with one or more database records. The report is stored on the database 205 and has detailed information associated with each data point. For example, the report underlying the data shown in FIG. 1 stores data associated with monthly sales of bicycles. The card 110 displayed in front of the catalogue 105 has the largest area visible to the user and hence displays detailed information related to the associated database records. The cards not displayed in the front, for example, card 115 are displayed hidden behind other cards and are only partially visible. These cards may display minimal information 130 required to identify the associated database records. The information 130 identifying a card 115 allows a user to estimate how far the card 115 is from the front card 110. This provides the user with an indication as to how fast the user needs to swipe to bring a card 115 to the front. The cards at the back of the catalogue, for example, card 120 may not display the information required to identify the associated data point. Hence, a marker data point 125 may be displayed that prominently displays information identifying data points near the marker data point 125.

The user input provided for moving the cards of the catalogue can be, for example, a swiping motion of a pointing/selecting device pointing on the display in a particular direction. In some embodiments, the pointing device can be the user's finger if the display screen 225 is touch-sensitive. The input provided by the user is detected by the input/output driver 220. The direction of swiping corresponds to the intended direction of movement of the cards. The requested direction of movement is checked by the input/output driver 220 and the cards of the catalogue moved accordingly. In some embodiments, the user can drag a pointing/selecting device, for example, a finger on the screen to cause the cards of the catalogue to move slowly or to flip the cards one by one. For example, a user may use a swiping motion to reach a particular group of cards adjacent to each other and then flip through the cards one by one to inspect individual cards. In some embodiments, the movement of the cards of the catalogue results in audio feedback, for example, each time a card is moved a sound is created. Hence, fast movement of the catalogue results in a different sound effect compared to slow movement.

Figure 3:
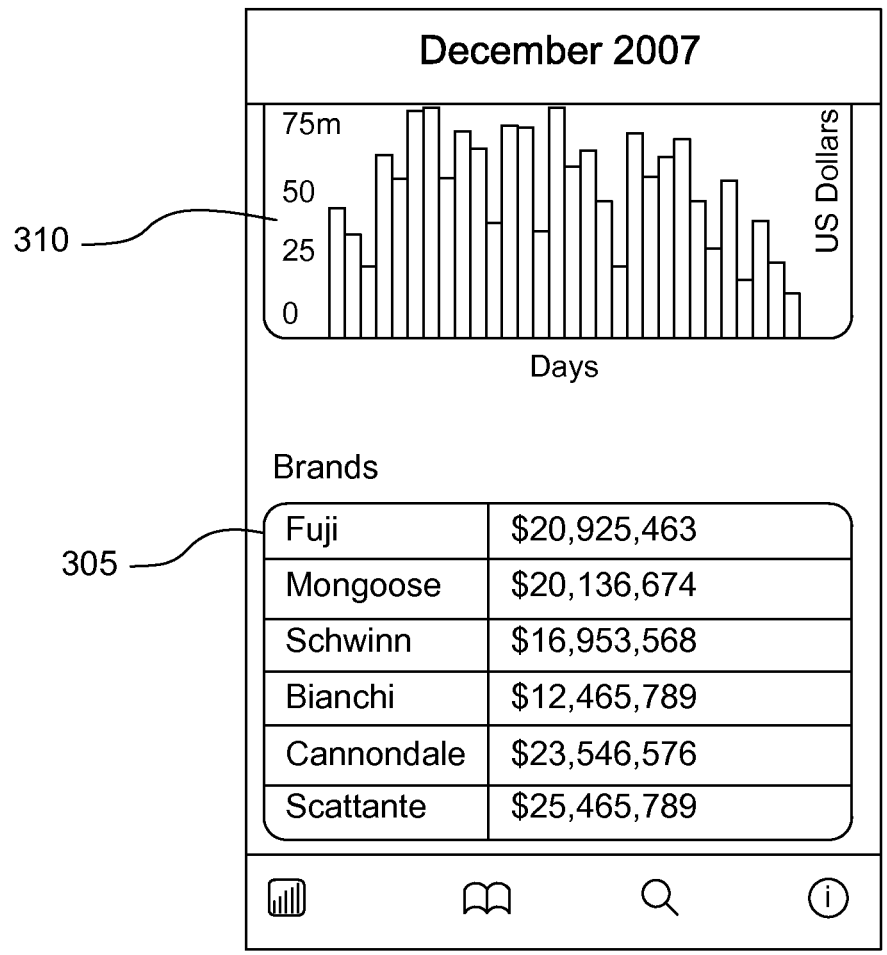
FIG. 3 shows an embodiment displaying the detailed information for a data point displayed on the front card of the catalogue without displaying the catalogue.

In some embodiments, once the catalogue is used to display information related to a particular database record, the display can be converted to a data inspection mode that does not display the other records in the catalogue, as shown in FIG. 3. The data inspection mode allows better display of data 305, 310 since there is larger display area available. Also, the user input that causes movement of the catalogue may be interpreted in a different manner on this screen, for example to allow the user to scroll through data that may not fit on the screen. The user can switch between the data inspection mode of display shown in FIG. 3 and a mode that displays the catalogue, thereby allowing the user to change the database record being inspected.

Figure 4C:
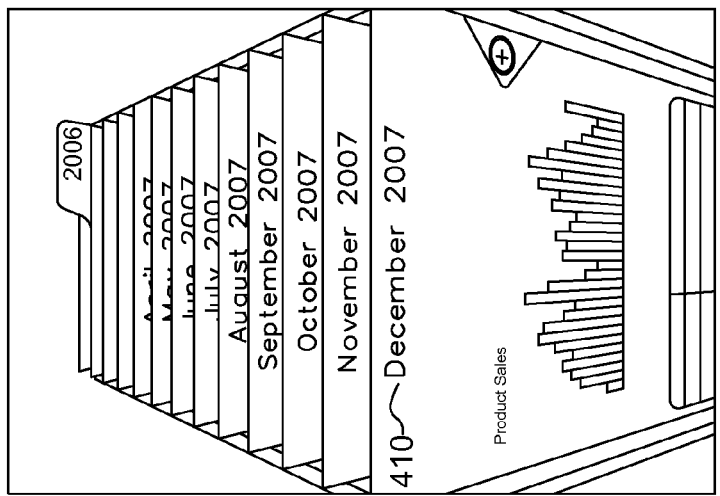
FIGS. 4 (A, B, C) illustrate how the swiping motion determines the movement of the catalogue in accordance with an embodiment of the present invention.
Figure 4B:
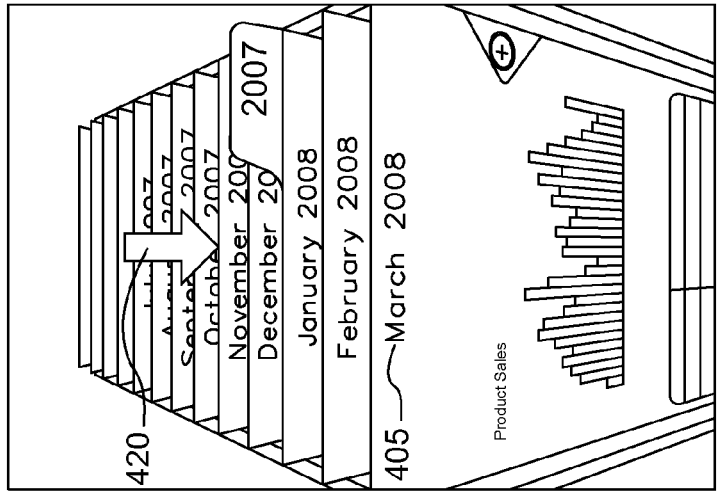
Figure 4A:
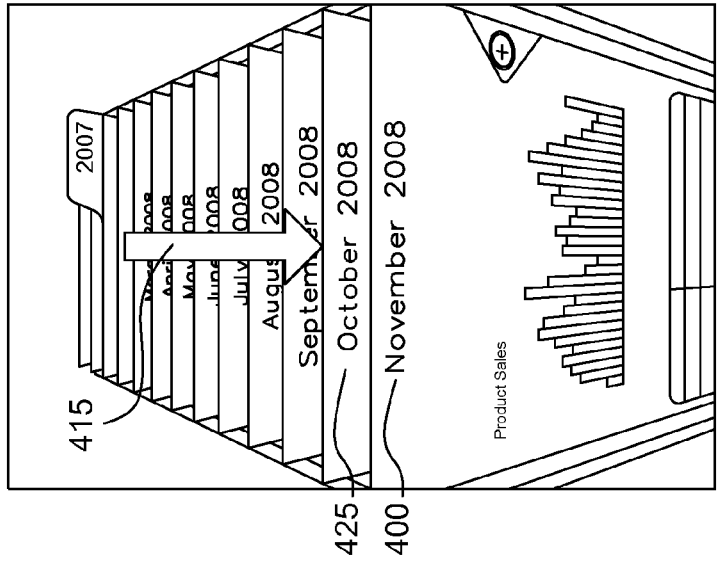

FIG. 4 illustrates how the user can change the record displayed in the front of the catalogue by swiping. The user can provide swiping motion with a pointing device, causing the cards to move, thereby changing the front card 110 and displaying a different database record. FIG. 4(A) shows card 400 in the front displaying data for the month of November 2008 whereas the cards at the back represent data associated with previous months. The swiping movement by a pointing device in the direction of arrow 415 causes the cards to move from back to front. The arrow 415 is displayed longer than the arrow 420 indicating the swiping input in FIG. 4(A) is faster than the swiping input in FIG. 4(B). The swiping motion shown in FIG. 4(A) causes the catalogue to move longer than the swiping motion displayed in FIG. 4(B). The front card 400 displaying information for November, 2008 in FIG. 4(A) is replaced by card 405 displaying information for March 2008 in FIG. 4(B) due to the catalogue moving by eight cards between November 2008 and March 2008. On the other hand, the front card 405 displaying information for March, 2008 in FIG. 4(B) is replaced by card 410 displaying information for December 2007 in FIG. 4(C) due to the catalogue moving by four cards between March 2008 and December 2007.

The direction of swiping determines the direction in which the catalogue is displayed as moving. For example, swiping in the direction of arrow 415 shown in FIG. 4 causes the cards to move towards the viewer, whereas swiping in a direction opposite to arrow 415 causes the cards to move away from the viewer. If the cards are displayed moving away from the viewer, new cards are displayed in the front adding new data points to the front. On the other hand, if the cards are displayed as moving towards the viewer, the card previously displayed in the front is not displayed as it is replaced by a card from the back.

In some embodiments, the simulated movement of the catalogue is modeled on the basis of a physical system that moves. As the user provides the swiping motion, the catalogue is moved with an initial velocity determined on the basis of the speed and direction of swiping. A drag effect is modeled that decelerates the movement of the catalogue thereby reducing its velocity. The deceleration of the catalogue is determined by a pre-determined drag coefficient value used to model the drag effect. The velocity of the catalogue is reduced as the catalogue moves until the catalogue stops and displays information related to a particular record on the front card. The record displayed on the front card when the catalogue stops can be pre-calculated before the catalogue comes to a stop allowing the information related to the record to be preloaded. In reports where significant amount of information needs to be presented for each data point, the fetching of information displayed is overlapped with the simulated movement of the catalogue, thereby hiding the overhead of fetching the information.

In some embodiments, a check is made to ensure that when the cards stop moving as a result of user input, the movement stops with a single card displayed. If the calculated stop position would result in a display in between two cards, motion is continued so that the next card is displayed, in one embodiment, or the next to last card is displayed, in other embodiments. Alternatively, the catalogue is moved automatically in the direction that causes the card displaying larger area to be displayed as the front card next. The cards of the catalogue may be displayed as wiggling or vibrating before the cards come to a complete halt, similar to a spring coming to a halt after being released from tension. In some embodiments, only a subset of cards close to the viewer is shown wiggling or vibrating. The cards closer to the viewer may be displayed as wiggling or vibrating with a larger amplitude than the cards away from the viewer, for example, the amplitude of the card displayed in the front being maximum and decreasing for the cards away from the viewer.

Figure 5:
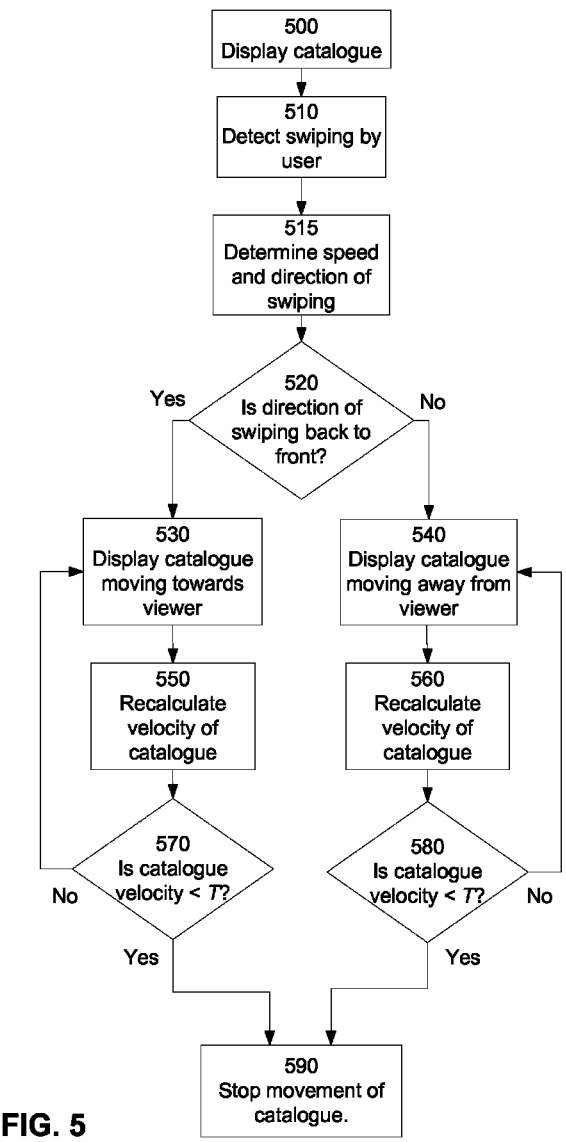
FIG. 5 shows a flowchart illustrating how user input is received to determine movement of the catalogue in accordance with an embodiment of the present invention.

FIG. 5 shows a flowchart illustrating the process used for determining the movement of a catalogue based on swiping motion of a pointing device. The catalogue is initially displayed 500 with a particular record displayed on the front card. The input/output driver 220 detects 510 the user input swiping in a direction and determines 515 the direction and speed with which the user swipes. The velocity with which a user swipes can be determined by detecting two positions on the display screen 225 associated with the pointing device used for swiping as the user swipes. The distance between the two positions and the time taken by the pointing device to reach from one position to another can be used to determine the velocity of swiping. The initial velocity of the catalogue $V_0$ can be the velocity of swiping or the velocity of swiping weighted by a predetermined constant value.

If the estimated velocity of the catalogue is determined to be below a predetermined threshold value T, the cards are not moved. A drag factor D is assumed that causes the catalogue to decelerate. The direction of swiping is determined 520 to determine the direction in which the cards are displayed as moving. The cards are displayed moving in the direction of swiping, for example, if the direction of swiping is determined to be back to front, the cards are displayed 530 as moving from back to front, whereas if the direction of swiping is from front to back, the cards are displayed 540 as moving from front to back. Periodically, the velocity of the catalogue is recalculated 550, 560 by applying the drag factor D to the current velocity. For example, the velocity can be recalculated each time the card displayed in the front is changed as the catalogue moves. In one embodiment, the velocity of the catalogue $V_n$ after the card displayed in front is changed n times can be determined by the following equation.

$$V_n = V_0 \times D^n \quad (1)$$

If a determination 570, 580 is made that the velocity of the catalogue is below the threshold T, the movement of the catalogue is stopped 590. The card displayed in the front is changed C times before the catalogue stops from an initial velocity $V_0$. The value of C can be calculated by substituting $V_n = T$ in equation (1) resulting in following equation.

$$T = V_0 \times D^C \quad (2)$$

An example value of D is 0.7 and an example value of T is 2.0 seconds. The equation (2) can be rewritten to calculate the value of C as follows.

$$C = \log_D(T/V_0) \quad (3)$$

Hence, a catalogue that starts moving with an initial velocity of $V_0$ stops after displaying C cards in the front where C can be determined by equation (3). Equation (3) uses a logarithm to base D. The equation (3) can be re-written to use logarithms to any other base k as follows.

$$C = \frac{\log_k(T/V_0)}{\log_k(D)} \quad (4)$$

In other embodiments, the recalculation of the velocity comprises subtracting a predetermined value from the previous velocity, resulting in a linear deceleration. Equations similar to the above equations (1-4) can be derived for a linear deceleration. Note that while the catalogue is moving, the cards displayed in the front do not have to display detailed information for a database record associated with the front card. The detailed information has to be displayed only for the card displayed when the catalogue stops moving. The ability to determine C allows preloading of information displayed on the front card when the catalogue stops moving.

Figure 6:
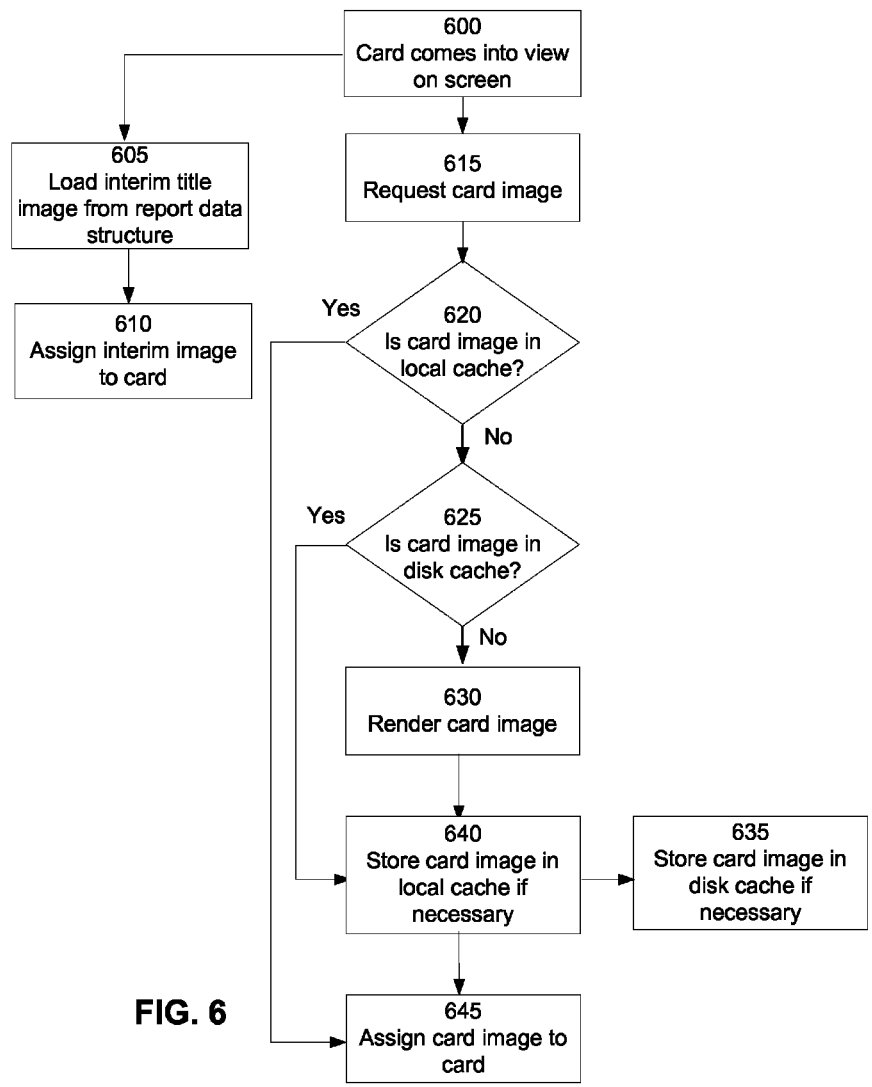
FIG. 6 shows a flowchart illustrating how the card image is either rendered or loaded in accordance with an embodiment of the present invention.
Figure 7A:
FIGS. 7 (A, B) show an interim title image for a card and a fully rendered image of the card in accordance with an embodiment of the present invention.

Detailed information is displayed for the card in the front when the catalogue stops moving. The card image is rendered by the data renderer 215. The rendering of a card image can be a computationally slow process. If the rendering of the card image for a card that is displayed is started after the catalogue stops moving, there may be a noticeable delay between the stopping of the catalogue and displaying of the card image. In some embodiments, the displaying of a card image can be made efficient by rendering the card image in advance, before it is displayed. Furthermore, rendered images of cards can be stored in a cache memory for fast access. FIG. 6 shows a flowchart illustrating a process used for efficiently rendering card images and displaying them. FIG. 7(A) shows an interim title image 700 for each record that is stored in the data structure that stores the underlying records to be displayed. When a card comes 600 into view due to swiping input provided by the user, the interim title image for the record is loaded 605 and assigned 610 to the card. Along with the loading of the interim title image, an asynchronous task can be executed requesting 615 a card image. In some embodiments, the asynchronous task is executed by a separate execution thread that can be executed concurrently with the loading of the interim title image. The concurrent execution of the two tasks is likely to be more efficient than execution of the tasks one after another sequentially.

In some embodiments, a queue data structure is maintained by the data renderer 215 to schedule the rendering of cards. The queue contains a set of cards to be rendered, ordered according to when they are most likely be displayed to the user. The data renderer picks the card in the front of the queue and renders it. When the card in the front of the queue is rendered, it is removed from the queue causing the next card to move to the front of the queue, ready to be rendered next. When the catalogue is moving as a result of a swiping input provided by the user, the destination card expected to show at the end of the catalogue movement is kept in the front of the queue and the cards in the neighborhood of the destination card are added behind the destination card in the queue. Rendering the cards in the neighborhood of the destination card in advance makes them available for quick display in case the user decides to flip through them one by one. In one embodiment, the position of the cards in the queue is such that cards closer to the destination card are ahead of the cards away from the destination card. This positioning of the cards in the queue is based on the assumption that the likelihood of a user viewing a card close to the destination card is higher than the likelihood of viewing a card further away from the destination card.

The user can interrupt a catalogue that is moving, for example by providing a new swiping motion, causing the catalogue to move to a new destination. In this case, the new destination card is added to the front of the queue along with cards in the neighborhood of the new destination. The original destination card and cards in the neighborhood of the original destination are marked for deletion from the queue. Alternatively, a periodic check of the queue may be performed by the card renderer 215 to clear cards that do not need to be rendered. In one embodiment, only a small percentage of the cards of the catalogue are stored in the queue and rendered at a time. For example, the catalogue may represent millions of cards of which only 10-12 cards are stored in the queue at a time and rendered.

Figure 7B:
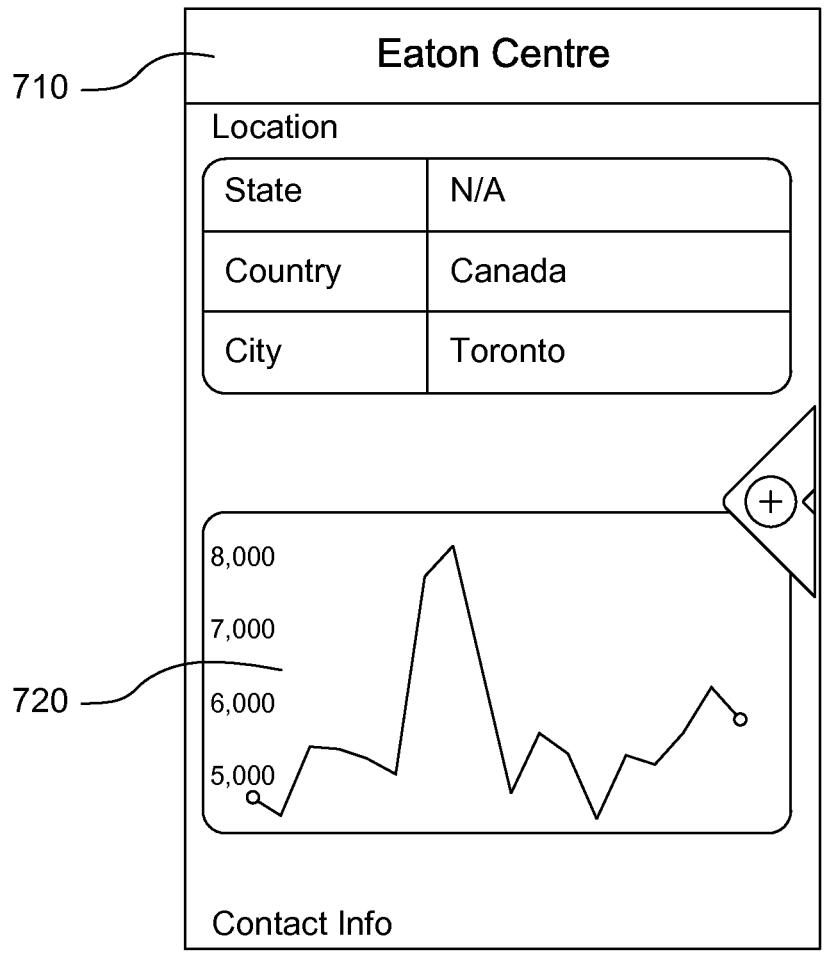

Card images rendered previously may be stored in an in-memory local cache for fast access. Since the number of cards that can be stored in-memory may be limited due to limited memory size, additional card images rendered may be stored on a disk cache. First the local cache is checked 620 for availability of the requested card image. If the card image is not found in the local cache, the disk cache is checked 625 for availability of the requested card image. If the card image is not found in the disk cache, the card image is rendered 630. FIG. 7(B) shows a card image that is rendered and displays detailed information 720 along with the title image 700. The rendering of a card image is a slow process. Hence, the card image that is rendered is stored 640 in the local cache for future access. The card image that is loaded from the disk is also stored 640 in the local cache if it doesn't exist in the local cache already. Similarly, the card image stored 640 in local cache is stored 635 in the disk cache if it doesn't exist in the disk cache already. Once the card image is available either by rendering or by loading from the local cache or disk cache, the card image is assigned to the card and can be used whenever the card is displayed. The process of loading or rendering a card image can be executed asynchronously compared to the process of displaying the catalogue, for example, the image can be rendered in the background using a separate execution thread. Hence, as soon as the need for displaying a card image is anticipated, the process of obtaining the card image either from the cache or by rendering is started in advance, so that the image is readily available when the card needs to be displayed. The use of a cache allows reuse of the card images that have been rendered, for example, when a user is flipping across various cards back and forth and displays the same card multiple times.

Figure 8A:
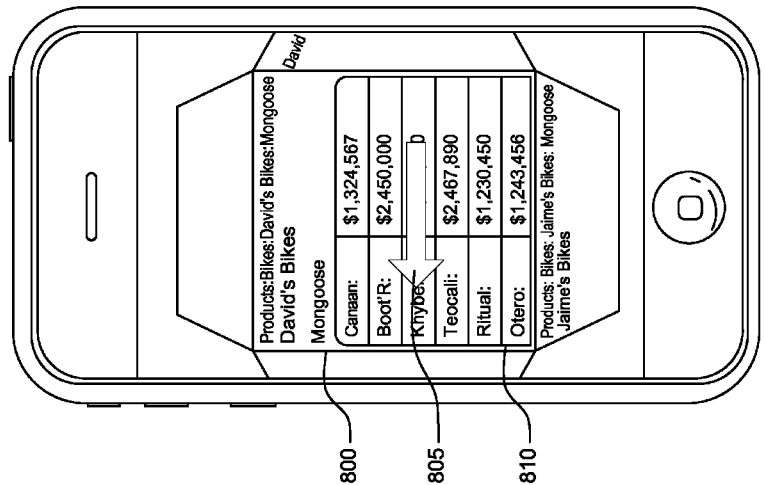
FIGS. 8 (A, B, C) illustrate how a simulated cube can be rotated by swiping to display database records in accordance with an embodiment of the present invention.
Figure 8B:
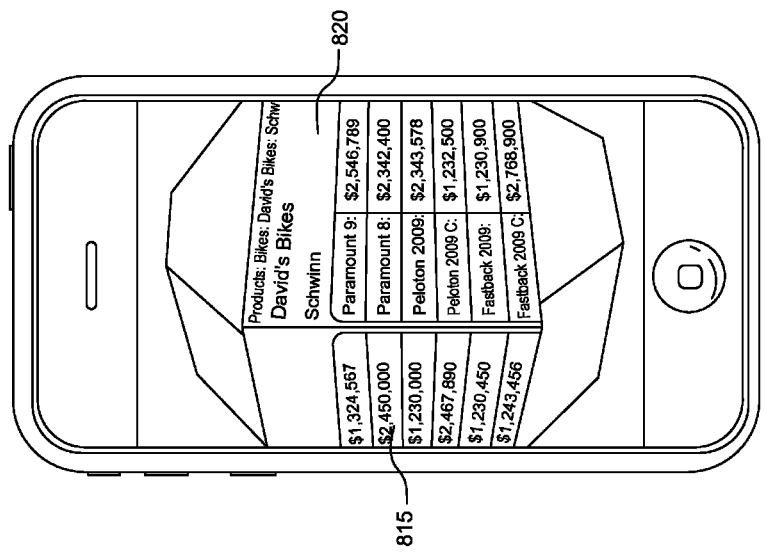
Figure 8C:
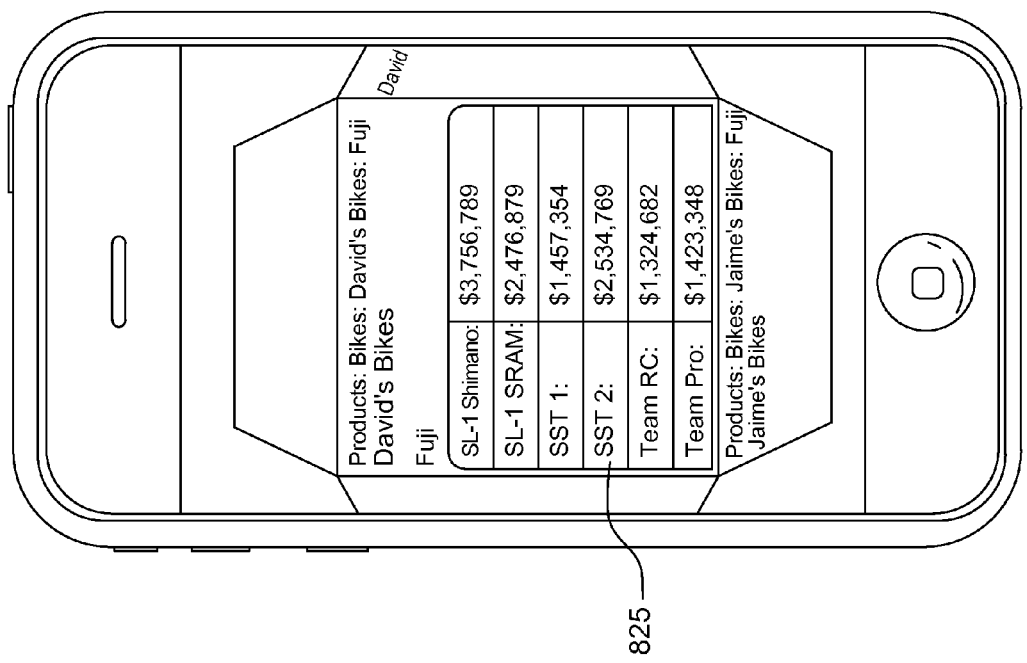

Alternative embodiments may display an image of an object different from a catalogue that can be associated with underlying data and can display movement of the object resulting in changing the data points displayed, for example, a rolodex. In some embodiments a cube 800 is used to display data associated with reports, for example, as shown in FIG. 8. A user rotates the cube by swiping on the cube with a pointing device. The rotation of the cube causes information related to different data points to be displayed on the face of the cube displayed to the user. A user swiping in the horizontal direction 805 causes the cube to rotate horizontally as displayed in FIG. 8. The underlying data displayed for a cube can be a multi-dimensional chart. Rotation of the cube along a particular direction allows user to inspect data points along a particular axis of the underlying chart. For example, horizontal rotation of the cube allows a user to view data points by changing their x-coordinates whereas vertical rotation allows the user to view different data points by changing the y-coordinates. FIG. 8 shows horizontal rotation of the cube, for example, FIG. 8(A) displays the front face 810, FIG. 8(b) displays two partial faces 815, 820, and FIG. 8(C) displays a new front face 825 when the horizontal rotation of the cube stops.

The speed and direction of rotation of the cube can be determined based on the speed and direction in which the user swipes. Faster swiping causes the cube to rotate fast, allowing the user to display a data point several coordinates away from a displayed data point. The user interface does not have to display details of intermediate data points while the cube is rotating and can display the destination data point when the rotation of the cube stops. The equations (1-4) described above can be modified to determine the movement of the cube based on the swiping motion. The cube may be rotated at an initial rotational speed determined by the speed of swiping. A drag factor can be assumed that decelerates the rotation of the cube. Each time a new face of the cube is displayed, the speed of rotation reduced by the drag factor until it reaches below a pre-determined threshold at which point the cube stops rotating and displays information for the data point reached. Since detailed information doesn't have to be displayed for the intermediate data points, the coordinates of the target data point displayed may be determined and data associated with the target data point preloaded while the cube is displayed as rotating. The mechanism can be generalized to other three-dimensional rotatable objects used for displaying multi-dimensional chart data.

In some embodiments, if the user input causing the rotation of the cube leaves the cube in a position displaying two partial front faces, the cube is continued to be rotated automatically in its current direction of rotation until a face is fully displayed. Alternatively, if the user input causing the rotation of the cube leaves the cube in a position displaying two partial faces in the front, the cube is automatically rotated in the direction that causes the face occupying larger area on the screen to be displayed in the front. The cube may be displayed as wiggling or vibrating before it comes to a complete halt, similar to a spring coming to a halt after being released from tension.

Figure 9:
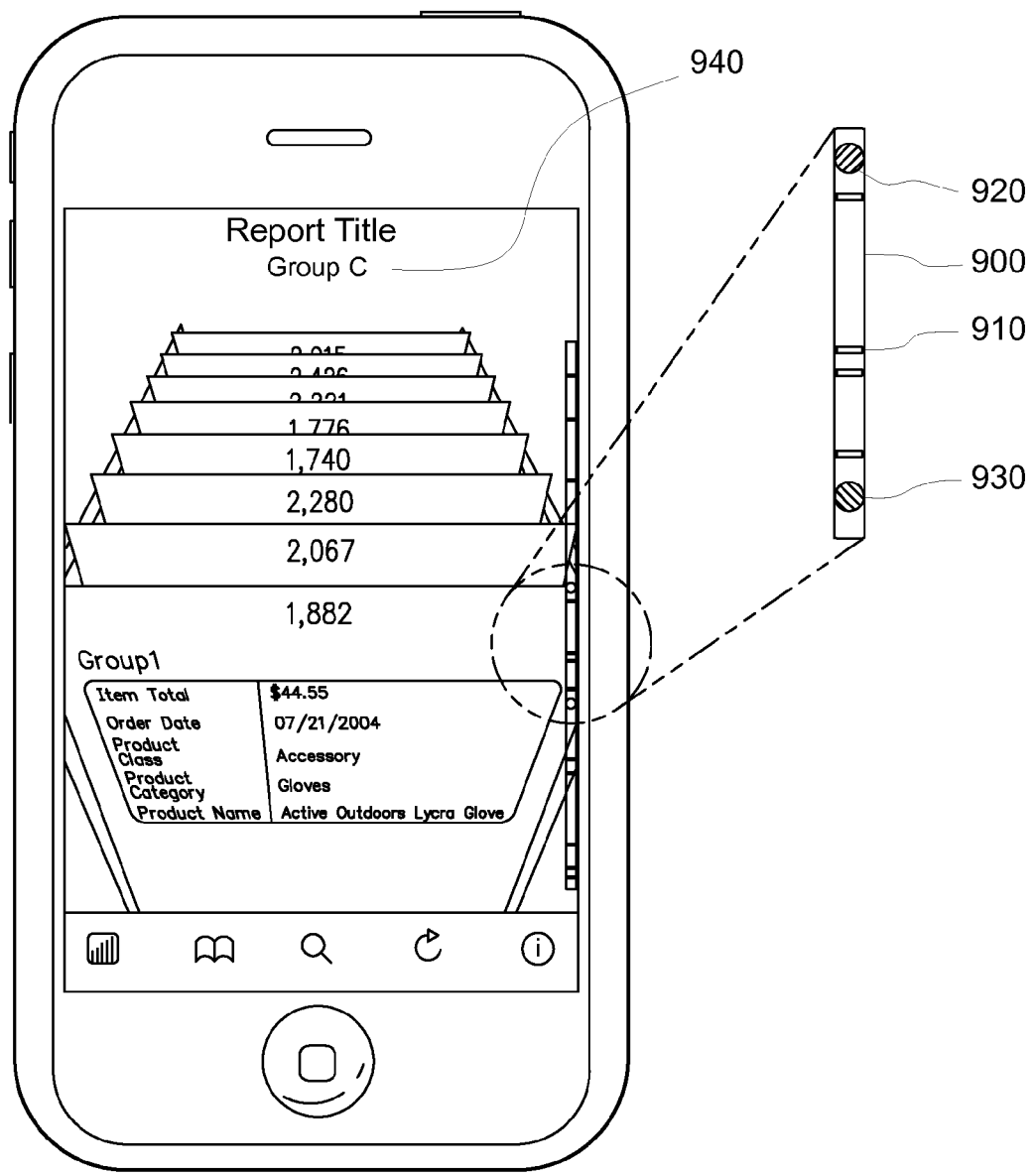
FIG. 9 shows an embodiment displaying a scrollbar associated with the catalog.
Figure 10:
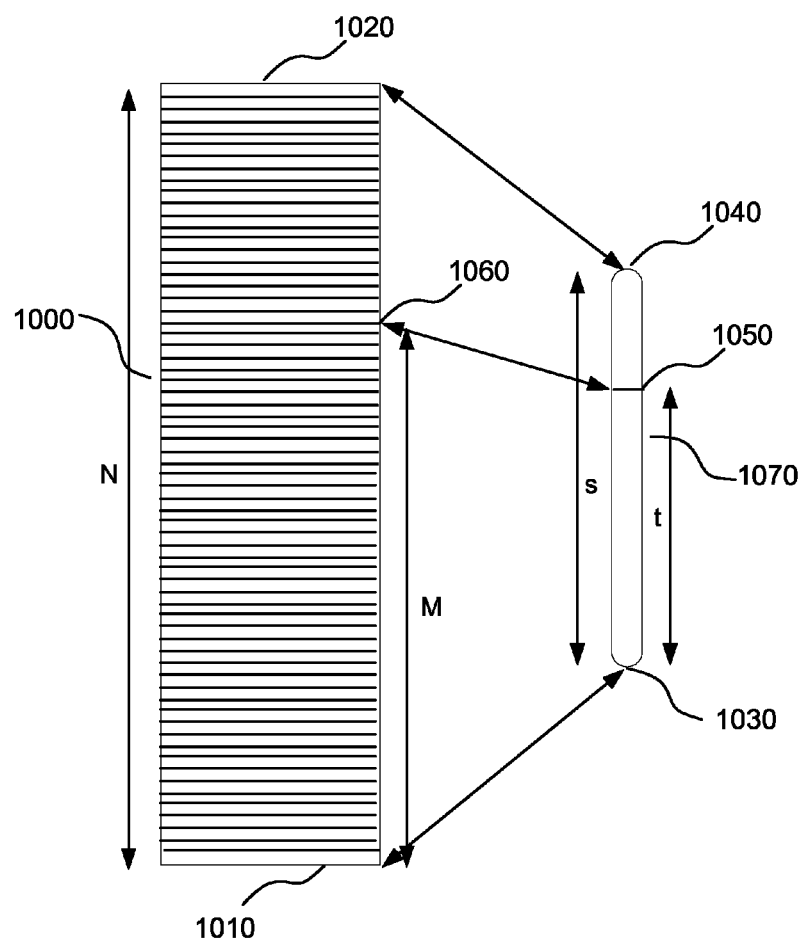
FIG. 10 illustrates how the position of a card displayed by the catalogue is calculated along the scrollbar in accordance with an embodiment.

In some embodiments, as shown in FIG. 9, a scrollbar is displayed along with the catalogue to assist with scrolling through the catalog. The scrollbar represents the entire set of cards that is represented by the catalog. The scrollbar 900 may be a thin strip of a color distinguishing it from the surrounding, for example a four pixel wide strip of light grey color, assuming the color surrounding the scrollbar is a dark shade of grey. Each card corresponding to records that can be displayed on the catalogue can be mapped to a position on the scrollbar. FIG. 10 shows how the position of a card on the scrollbar 1070 can be calculated. The complete set of cards 1000 is assumed to include N cards where the first card is at the bottom of the stack 1010 and the last card is at the top of the stack 1020. The bottom card 1010 corresponds to position 1030 on the scrollbar 1070 and the top card 1020 corresponds to position 1040 on the scrollbar. The position of the $M^{th}$ card 1060 corresponds to the position 1050 on the scrollbar. The position 1050 is at distance t from the bottom of the scrollbar 1030, where s is the length of the scrollbar and t is calculated as:

$$t = \frac{M}{N} \times s \quad (5)$$

Referring again to FIG. 9, a thumb of a particular color on the scrollbar, for example, a green thumb 920 displays the current position of the card that is displayed to the user. A second thumb of a different color on the scrollbar, for example, a red thumb 930 displays the destination card determined based on the current movement of the catalogue assuming the current scrolling is not interrupted. The thumbs on the scrollbar may be distinguished using other mechanisms, for example, shading instead of color. When the catalog is scrolling, the green thumb 920 moves towards the red thumb 930 until it stops moving as it merges with the red thumb and the red thumb is not displayed any more. In some embodiments, the user drags the red thumb 930 to indicate the region of the catalog that the user is interested in viewing. When, the red thumb 930 is dragged to a new location, the new location becomes the destination of the green thumb 920. Hence, the thumbs can either indicate the movement of the catalog as determined by swiping input or the thumbs allow a user to provide input to indicate the desired movement of the catalog.

In some embodiments, the cards may be divided into sets representing categories of data. Each category corresponds to a consecutive set of cards. A tab 910 indicates the position of the card at one end of the category of cards. The tabs 910 may be represented by a color distinguishing the tab from the color of the scrollbar, for example, using a shade of grey darker than the color of the scrollbar. A report title 940 indicates the category of card currently displayed in the front that also corresponds to the category of cards in which the green tab 920 is present. As the catalogue scrolls, the category of the card displayed in front can change, thereby changing the report title 940 displayed.

It is to be understood that the Figures and descriptions of the present invention have been simplified to illustrate elements that are relevant for a clear understanding of the present invention, while eliminating, for the purpose of clarity, many other elements found in a typical system that allows users to view report data. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

Some portions of above description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for effectively displaying database records on a display screen with limited area through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for graphically displaying database records on a display screen with limited display area, the method comprising:
   associating a plurality of database records with a cube, the plurality of database records representing a multi-dimensional chart, wherein the cube displays a first database record on a face displayed in front of the cube on a display screen, wherein a first direction of rotation of the cube is associated with a first axis of the multi-dimensional chart and a second direction of rotation of the cube is associated with a second axis of the multi-dimensional chart;
   in response to an input, animating by rotating the cube, to change the face displayed in the front of the cube on the display screen, wherein the rotation of the cube along the first direction displays the plurality of database records along the first axis on the face in the front of the cube and the rotation of the cube along the second direction displays the plurality of database records along the second axis on the face in the front of the cube;
   preloading the plurality of database records including a final database record while the cube is animating;
   determining the final database record from the preloaded plurality of database records; and
   while the cube stops animating, displaying the determined final database record on the face in the front of the cube on the display screen.

2. The computer-implemented method of claim 1, wherein the input is associated with an input speed value and a speed of the animation for rotating the cube is initialized to a first speed value based on the input speed value.

3. The computer-implemented method of claim 2, wherein the speed of the animation for rotating the cube is associated with a second speed value, wherein the second speed value is less than the first speed value and greater than a predetermined minimum threshold, and wherein the second speed value is determined by multiplying the first speed value by a predetermined drag value.

4. The computer-implemented method of claim 1, wherein the input includes a swiping gesture across the display screen.

5. The computer-implemented method of claim 1, wherein the input includes a swiping gesture across the display screen and an input speed value is determined based on a speed of the swiping gesture.

6. The computer-implemented method of claim 1, wherein the plurality of database records represent pages of report data.

7. The computer-implemented method of claim 1, wherein in response to the input causing the cube to stop rotating in a position displaying two partial faces in the front of the cube, continuing to animate the cube until one of the two partial faces is fully displayed on the display screen.

8. The computer-implemented method of claim 1, wherein in response to the input causing the cube to stop rotating in a position including displaying two partial faces in the front of the cube, continuing to animate the cube until one of the two partial faces occupies a larger area on the display screen.

9. A computer-implemented method for graphically displaying database records on a display screen with limited display area, the method comprising:
   associating a plurality of database records with a three-dimensional rotatable object, the plurality of database records representing a multi-dimensional chart, wherein the three-dimensional rotatable object displays a database record on a face displayed in front of the three dimensional rotatable object on a display screen, wherein a first direction of rotation of the three-dimensional rotatable object is associated with a first axis of the multi-dimensional chart and a second direction of rotation of the three-dimensional rotatable object is associated with a second axis of the multi-dimensional chart;
   in response to an input, animating by rotating the three dimensional rotatable object, to change the face displayed in the front of the three-dimensional rotatable object on the display screen, wherein the rotation of the three-dimensional rotatable object along the first direction displays the plurality of database records along the first axis on the face in the front of the three-dimensional rotatable object and the rotation of the three-dimensional rotatable object along the second direction displays the plurality of database records along the second axis on the face in the front of the three-dimensional rotatable object;
   preloading the plurality of database records including a final database record while the three dimensional rotatable object is animating;

determining the final database record from the preloaded plurality of database records; and while the three dimensional rotatable object stops animating, displaying the determined final database record on the face in the front of the three-dimensional rotatable object on the display screen.

10. The computer-implemented method of claim 9, wherein the input is associated with an input speed value and a speed of the animation for rotating the three dimensional rotatable object is initialized to a first speed value based on the input speed value.

11. The computer-implemented method of claim 10, wherein the speed of the animation for rotating the three-dimensional rotatable object is associated with a second speed value, wherein the second speed value is less than the first speed value and greater than a predetermined minimum threshold, wherein the second speed value is determined by multiplying the first speed value by a predetermined drag value.

12. The computer-implemented method of claim 9, wherein the input includes a swiping gesture across the display screen and an input speed value is determined based on a speed of the swiping gesture.

13. A non-transitory computer-readable storage medium storing instructions for:

associating a plurality of database records with a cube, the plurality of database records representing a multi-dimensional chart, wherein the cube displays a first database record on a face displayed in front of the cube on a display screen, wherein a first direction of rotation of the cube is associated with a first axis of the multi-dimensional chart and a second direction of rotation of the cube is associated with a second axis of the multi-dimensional chart;

in response to an input, animating by rotating the cube, to change the face displayed in the front of the cube on the display screen, wherein the rotation of the cube along the first direction displays the plurality of database records along the first axis on the face in the front of the cube and the rotation of the cube along the second direction displays the plurality of database records along the second axis on the face in the front of the cube;

preloading the plurality of database records including a final database record while the cube is animating;

determining the final database record from the preloaded plurality of database records; and while the cube stops animating, displaying the determined final database record on the face of the cube on the display screen.

14. The non-transitory computer-readable storage medium of claim 13, wherein the input is associated with an input speed value and a speed of the animation for rotating the cube is initialized to a first speed value based on the input speed value.

15. The non-transitory computer-readable storage medium of claim 14, wherein the speed of the animation for rotating the cube is associated with a second speed value, wherein the second speed value is less than the first speed value and greater than a predetermined minimum threshold, and wherein the second speed value is determined by multiplying the first speed value by a predetermined drag value.

16. The non-transitory computer-readable storage medium of claim 13, wherein the input includes a swiping gesture across the display screen and an input speed value is determined based on a speed of the swiping gesture.

17. A non-transitory computer-readable storage medium storing instructions for:

associating a plurality of database records with a three-dimensional rotatable object, the plurality of database records representing a multi-dimensional chart, wherein the three-dimensional rotatable object displays a database record on a face displayed in front of the three dimensional rotatable object on a display screen, wherein a first direction of rotation of the three-dimensional rotatable object is associated with a first axis of the multi-dimensional chart and a second direction of rotation of the three-dimensional rotatable object is associated with a second axis of the multi-dimensional chart;

in response to an input, animating by rotating the three dimensional rotatable object, to change the face displayed in the front of the three-dimensional rotatable object on the display screen, wherein the rotation of the three-dimensional rotatable object along the first direction displays the plurality of database records along the first axis on the face in the front of the three-dimensional rotatable object and the rotation of the three-dimensional rotatable object along the second direction displays the plurality of database records along the second axis on the face in the front of the three-dimensional rotatable object;

preloading the plurality of database records including a final database record while the three dimensional rotatable object is animating;

determining the final database record from the preloaded plurality of database records; and while the three dimensional rotatable object stops animating, displaying the determined final database record on the face of the three-dimensional rotatable object on the display screen.

18. The non-transitory computer-readable storage medium of claim 17, wherein the input associated with of an input speed value and a speed of the animation for rotating the three dimensional rotatable object is initialized to a first speed value based on the input speed value.

19. The non-transitory computer-readable storage medium of claim 18, wherein the speed of the animation for rotating the three-dimensional rotatable object is associated with a second speed value, wherein the second speed value is less than the first speed value and greater than a predetermined minimum threshold, wherein the second speed value is determined by multiplying the first speed value by a predetermined drag value.

* * * * *